Nov. 9, 1965     W. S. LENIHAN, JR., ET AL     3,216,710
ALUMINUM VAPORIZER
Filed June 30, 1961
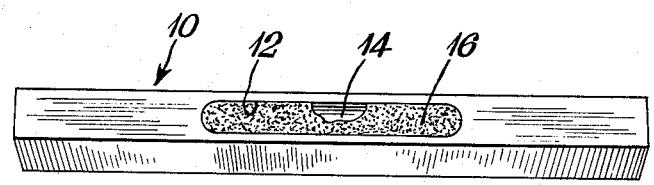
INVENTORS
WILLIAM S. LENIHAN, JR.
MARTIN A. ROCHE, JR.
BY Robert C. Cummings
ATTORNEY United States Patent Office 3,216,710
Patented Nov. 9, 1965

3,216,710
ALUMINUM VAPORIZER
William S. Lenihan, Jr., Fairview Park, and Martin A. Roche, Jr., Fostoria, Ohio, assignors to Union Carbide Corporation, a corporation of New York
Filed June 30, 1961, Ser. No. 121,069
7 Claims. (Cl. 263—48)

The subject invention relates to methods and apparatus wherein metals are vaporized on a continuous or semi-continuous basis in order to deposit thin films thereof on various objects. While applicable to other metals, the invention will be described mainly by reference to aluminum.

The vaporization of aluminum usually is effected in a vacuum chamber containing objects to which aluminum films or aluminum coatings are to be applied. A crucible or evaporator vessel containing the aluminum to be vaporized is placed in this vacuum chamber, and the crucible is heated, usually by electrical resistance or by electromagnetic induction.

The most common practice in this art is to use crucibles composed of carbon or graphite. Owing to the very short operating life of these materials, due to corrosion caused by molten aluminum at its vaporizing temperature, such crucibles are usually coated on the actual evaporation surface with a chemically deposited impervious layer of wettable carbide such as the carbide of titanium, zirconium, silicon or tungsten. Such a carbide coating may be formed by chemically reacting at high temperature the desired metal or its hydride with the carbon or graphite surface. Alternatively, and particularly in the case of tungsten, the metal may be dissolved in the molten aluminum in the crucible thereby causing it to react to form a carbide coating during the initial stages of the metal vaporization run. Neither of these methods of applying an integrally bonded carbide coating has been found to be completely satisfactory. Reacting the metal or its hydride with the crucible surface requires a relatively expensive separate firing operation in an inert or reducing atmosphere. Deposition of the metal carbide layer from the molten aluminum bath sometimes affects the surface appearance of the vapor deposited aluminum film. More importantly, such coating procedures may affect the control and lower the efficiency of the vaporization operation due to a phenomenon which results in an enlargement of the coated area. This undesirable enlargement is thought to be due to thermal and solubility gradients between the dissolved metal and the carbon or graphite at the edges of the aluminum pool.

The use of a wettable carbide coating on the carbon or graphite crucible surface has, at best, resulted in only a two fold increase in crucible life. By way of example, electrically heated graphite crucibles of a size sufficiently large to maintain a rate of metal evaporation of 2½ grams per minute operating at about 1200° C. in a vacuum will last about 45 minutes before being eroded by the molten aluminum to the point of failure. Graphite crucibles coated with silicon carbide and operating under equivalent conditions are found to last about 90 minutes.

From the standpoint of resistance to corrosion the inertness of boron nitride to liquid aluminum would make it an ideal crucible material. Unfortunately, boron nitride is not electrically conductive and therefore crucibles of boron nitride cannot be heated directly by electric heating. Instead, it has been proposed that a boron nitride crucible be placed in a carbon container which is heated electrically, by resistance or induction. Together the boron nitride crucible and the carbon container form a double crucible. Although such a double crucible has some merit, in that it provides for uniform electric heating, it has a major drawback. Namely, after a period of time during which the crucible has operated as an aluminum vaporizer, the surface becomes readily wettable and gradually as the aluminum continues to be fed into the crucible, it may creep up and over the sides of the inner crucible onto the carbon crucible, and react to form aluminum carbide. The undesirable creeping effect is hastened to some extent when the outer crucible is heated inductively because of an electromagnetic lifting effect imparted to the molten aluminum in the inner crucible which is also within the high frequency field. Upon the formation of aluminum carbide, the carbon crucible tends to crack rapidly thus breaking the electrical heating circuit. The equipment then must be shut down, and new crucibles installed.

The industry has also resorted to the use of electrically conductive refractory materials other than carbon or graphite which are also resistant to molten aluminum. Such materials include the borides, silicides and nitrides of the transition metals belonging to Group IV (titanium, zirconium and hafnium), Group V (vanadium, niobium and tantalum) and Group VI (chromium, molybdenum and tungsten) of the Periodic Table.

It was found that while crucibles made from these materials had a longer operating life for vaporizing molten aluminum than carbon or graphite, they also had a number of inherent disadvantages. In addition to being much more expensive than carbon or graphite, these materials possess such a low electrical resistivity that crucibles made therefrom cannot be used in existing commercial metal vaporization chambers without first providing a much lower voltage-higher amperage source of current or by making the cross section of the crucibles so thin that it is too fragile to be considered practical.

A crucible which possesses suitable corrosion resistance combined with a practical electrical conductivity level is disclosed in co-pending U.S. patent application, Serial No. 45,069, filed July 25, 1960 in the name of V. Mandorf, Jr., this application and the subject application being the property of a common assignee. This application issued as U.S. Patent 3,181,968 on May 4, 1965.

The preferred crucibles or evaporator vessels disclosed in that application comprises from 30% to 70% by weight titanium diboride with the remainder boron nitride. Such crucibles are much more resistant to the corrosive action of molten aluminum and can be operated at considerably higher temperatures than a graphite body and consequently provide an evaporator size-for-size having a much higher rate of vaporization capacity. These crucibles are the first self-heated evaporator crucibles which made it practical to operate a commercial high speed metal vaporization process on a continuous basis.

Unfortunately, however, even these crucibles have not been found to be completely free from undesirable features. The increased service life of these crucibles is of course, due in part to the extreme inertness of boron nitride to chemical attack by molten aluminum. However, on the other hand, evaporator surfaces of crucibles containing boron nitride have been observed to be somewhat slowly wetted by molten aluminum. Due to the slowness of the wetting of the surface, it has been necessary to limit the heating current during the early part of the continuous vaporizing run to a level considerably below that which can be applied effectively after molten aluminum wets the entire vaporizing surface of the crucible. It has been observed that if full current is applied before complete wetting has occurred, current distribution is erratic and hot spots develop which may cause bubbling and globule ejection of the molten metal and/or early damage to the crucible itself. The dependency of an effective uniform current distribution upon an erratic wetting of the vaporization surface is especially undesirable when multiple vaporizers are loaded in parallel electrical circuiting across the power source.

Accordingly, the principal object of the invention is the manufacture of a crucible or evaporator vessel suitable for containing the molten material used in vacuum plating, which avoids the disadvantages of the prior art outlined above.

Another object of the invention is the manufacture of a self heated crucible suitable for containing molten aluminum for use in vacuum plating which may be subjected to the most effective heating current shortly after the introduction of molten aluminum therein.

A more specific object of the invention is the provision of a refractory, electrically conductive, molten aluminum resistant, readily wettable evaporator surface for a crucible intended for use in vacuum plating.

Broadly stated, the objects of the invention are accomplished by a titanium diboride-boron nitride crucible in which the evaporation surface has been treated with a carbide wetting agent chosen from the group consisting of titanium carbide, silicon carbide and boron carbide.

The invention will be more readily understood by reference to the accompanying drawing, wherein the single figure is a perspective view of a typical boat-shaped crucible, wherein the evaporating surface is in the shape of a cavity, and which embodies the principles of the invention.

More specifically, the crucible or evaporator vessel of the invention may be manufactured by distributing a plurality of discrete finely divided particles of titanium carbide, silicon carbide, or boron carbide on the evaporation surface of the type crucible disclosed and claimed in the above referred to co-pending application. The carbide particles provide a porous network which induces the distribution of molten aluminum over the desired evaporation surface and which allows the molten aluminum to immediately contact the titanium diboride-boron nitride surface.

Referring now to the drawing, a crucible 10 of a titanium diboride-boron nitride composition embodying the invention is illustrated. The crucible 10 is provided with a cavity 12, of which the actual evaporation surface 14 is covered with a network of discrete finely divided particles of titanium carbide, silicon carbide, or boron carbide.

An additional important advantage of the crucible of the invention is found in the fact that when titanium carbide, boron carbide or silicon carbide is provided according to the invention on the desired evaporation surface of a crucible which is composed of titanium diboride and boron nitride, there is no undesirable creeping effect and the molten aluminum will not creep beyond the confines of the treated surface unless the rate of aluminum feed to the cavity exceeds the overall rate of vaporization. With the crucible of the invention, the desired limited surface of evaporation may be restored readily after a period of over-feed by merely reducing the rate of feed or by increasing the crucible temperature. Evidently, the elimination of the undesirable edge creep effect is related to the presence of the untreated very poorly wettable boron nitride component of the crucible.

The success of the treated crucible of the invention is clear from the following example:

The inner surface of the vaporization cavity of a crucible machined to a shape corresponding to the crucible of the drawing from a hot pressed composition comprising 55% titanium diboride by weight and 45% boron nitride was coated by brushing on a light slurry consisting of 5 parts by weight of finely divided (thru 100 mesh) titanium carbide, 1 part rubber cement and 4 parts xylene. After drying for a few minutes in air, the painting operation was repeated until a total of three layers had been applied. The crucible was then dried in an oven at 110° C. overnight. The treated crucible which had an overall length of 9¾ inches, a width of 11/16 inch, an overall thickness of ½ inch and a cavity 4 inches x 7/16 inch wide x ⅛ inch deep was tested in a conventional vacuum metal vaporization chamber. With the chamber pressure reduced to below one micron of mercury, the crucible which was mounted between water cooled cast aluminum power supply jaws, was heated to approximately 1350° C. and high purity aluminum wire was fed continuously into the evaporator cavity. It was observed that the molten aluminum almost immediately covered the entire bottom of the evaporator cavity. The voltage across the power supply jaws was adjusted to maintain a temperature of about 1350° C. (±50° C.) and the rate of wire feed adjusted to the equivalent of 5.5 grams per minute. This condition of operation was maintained for a total of forty-six hours after which time the run was discontinued because the degree of errosion by the molten aluminum of the cavity side walls was considered to have become too severe to allow the test to continue. During the entire testing period and at the end of the run there was no evidence of progressive creeping of the molten aluminum at the edges of the cavity. Similarly controlled wetted surface areas were obtained when any one of the specified carbides was applied to flat evaporator vessels which initially had no evaporator cavity.

A crucible made of the same hot pressed boron-nitride-titanium diboride composition, but not treated with titanium carbide, was tested continuously under the same conditions of temperature and rate of aluminum vaporization. It became severely eroded in localized sites along the cavity walls and became so badly cracked after twenty-nine hours that the test had to be discontinued.

It was evident that the longer service life obtained by the pre-application of a wettable carbide to the desired evaporation surface of the crucible resulted not directly from any decrease in average rate of erosion by the molten aluminum but rather from the elimination of "hot spots" which are localized sites of rapid erosion in the crucible in the early part of the service period.

It is emphasized that the application of the specified aluminum wettable carbide to the evaporation surface does not constitute a protective impervious carbide coating such as is applied by chemical bonding in the prior art. Very effective, controlled, quickly wetted surfaces have been obtained on titanium diboride-boron nitride crucibles by merely dusting onto the desired surface a very light layer of finely divided titanium carbide, silicon carbide or boron carbide. The use of an organic bond such as rubber cement in a slurry as done in the example is only a more convenient means of application.

Although the method of heating the crucible described was through passage of current by voltage application at the ends, heating can also be effected by induced current or by other methods including electron bombardment or radiation.

It should be understood that the crucibles of the present invention can be used to melt or vaporize any metal which will not react appreciably with titanium diboride, boron nitride, or the selected wettable carbide, such as copper, silver, chromium, cadmium and others.

We claim:

1. A crucible for use in vacuum plating which comprises from about 30 to 70 percent by weight titanium diboride, the remainder being boron nitride, wherein the actual evaporation surface of said crucible is provided with a porous network of discrete finely divided particles of a carbide selected from the group consisting of titanium carbide, silicon carbide and boron carbide.

2. A crucible for use in vacuum plating molten aluminum which comprises from about 30 to 70 percent by weight titanium diboride, the remainder being boron nitride, wherein the actual evaporation surface of said crucible is provided with a porous network of discrete finely divided particles of a molten aluminum resistant, readily aluminum wettable carbide selected from the group consisting of titanium carbide, silicon carbide and boron carbide.

3. The crucible of claim 2 wherein said evaporation surface is in the shape of a cavity and said selected carbide is titanium carbide.

4. The crucible of claim 2 wherein said evaporation surface is in the shape of a cavity and said selected carbide is silicon carbide.

5. The crucible of claim 2 wherein said evaporation surface is in the shape of a cavity and said selected carbide is boron carbide.

6. The crucible of claim 3 wherein said particles of titanium carbide are bonded to said evaporation surface by an organic cement.

7. A crucible for use in vacuum plating molten aluminum which comprises approximately 55 percent by weight titanium diboride and 45 percent by weight boron nitride, and wherein the actual evaporation surface of said crucible is in the shape of a cavity which has bonded thereto by rubber cement a porous network of discrete finely divided particles of titanium carbide.

References Cited by the Examiner

UNITED STATES PATENTS

| | | | |
|---|---|---|---|
| 1,991,204 | 2/35 | Grenagle | 252—507 X |
| 2,665,223 | 1/54 | Clough et al. | 117—107 |
| 2,665,224 | 1/54 | Clough et al. | 117—107 |
| 2,872,327 | 2/59 | Taylor. | |
| 2,879,739 | 3/59 | Bugbee et al. | 118—49 |
| 2,984,807 | 5/61 | Blum | 117—107 X |
| 3,063,865 | 11/62 | Baer et al. | 118—49 X |

RICHARD D. NEVIUS, *Primary Examiner.*

JOSEPH B. SPENCER, *Examiner.*